July 6, 1954

D. M. KING 2,682,946

LOADING AND UNLOADING DEVICE FOR
USE WITH OVERHEAD CONVEYERS

Filed June 6, 1951

3 Sheets-Sheet 1

INVENTOR
Donald Mayer King
by:
Hauetine, Lake & Co.
AGENTS

July 6, 1954  D. M. KING  2,682,946
LOADING AND UNLOADING DEVICE FOR
USE WITH OVERHEAD CONVEYERS
Filed June 6, 1951  3 Sheets-Sheet 2
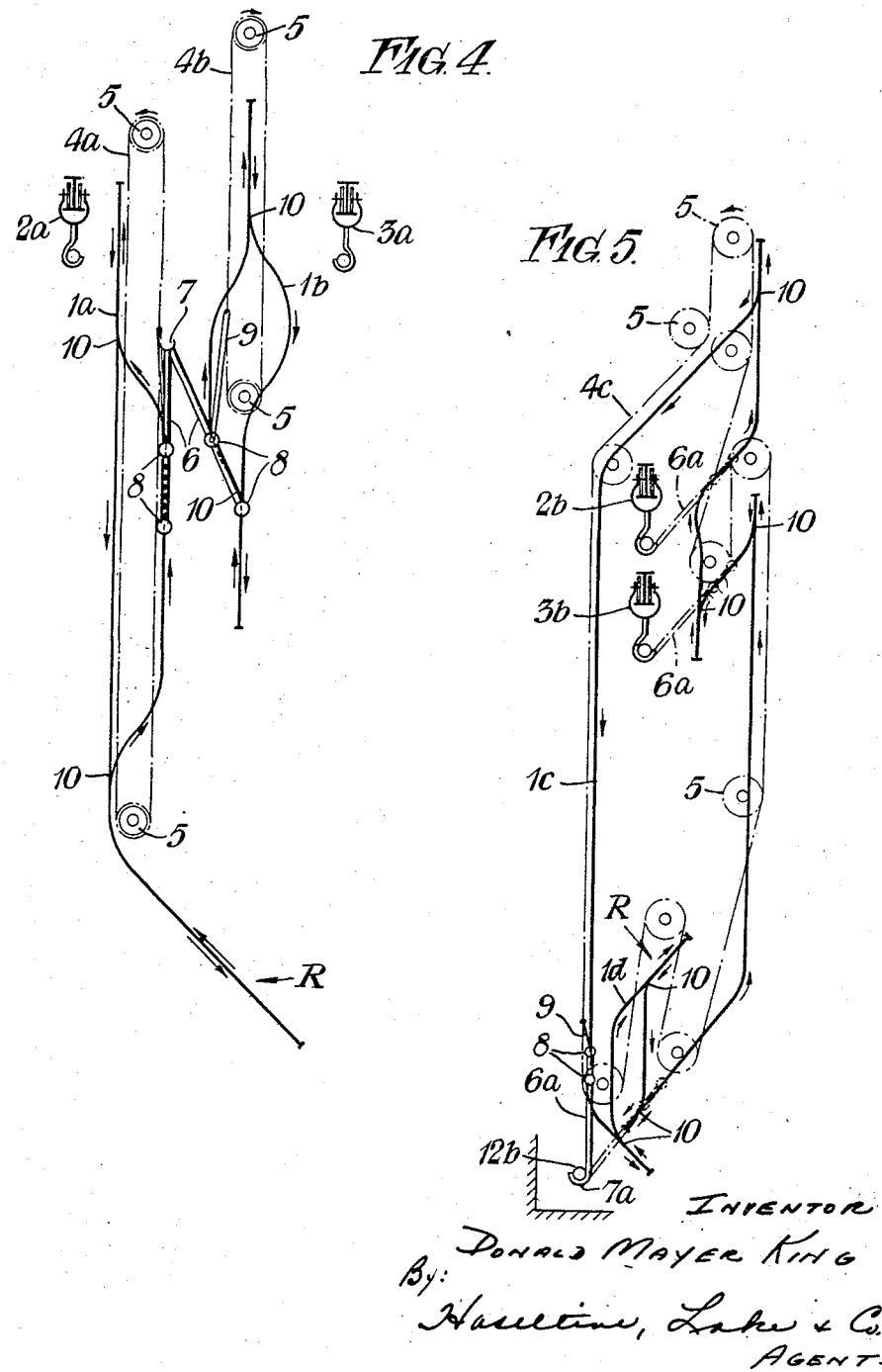

July 6, 1954

D. M. KING 2,682,946

LOADING AND UNLOADING DEVICE FOR
USE WITH OVERHEAD CONVEYERS

Filed June 6, 1951

3 Sheets-Sheet 3

INVENTOR
DONALD MAYER KING

BY:
Haseltine, Lake & Co.
AGENTS

Patented July 6, 1954

2,682,946

UNITED STATES PATENT OFFICE 2,682,946

LOADING AND UNLOADING DEVICE FOR USE WITH OVERHEAD CONVEYERS

Donald Mayer King, Hitchin, England

Application June 6, 1951, Serial No. 230,115

Claims priority, application Great Britain
June 9, 1950

5 Claims. (Cl. 198—20)

This invention relates to a loading and unloading device for use with overhead conveyors and is mainly concerned with the provision of such a device whereby the transfer of articles from an overhead conveyor to, for example, an underlying machine tool, and also from the machine tool to an overhead conveyor, can be effected automatically and extremely efficiently.

According to the invention, a carrier which is capable of picking up and transferring an article from a predetermined overhead position to a predetermined underlying position and vice versa is arranged to travel over a path or paths defined by guide track means extending between said positions, the movement of the said carrier over the path or paths being effected by link means coupled to the carrier and to a driven endless chain which lies in a plane which is substantially parallel to the plane containing the said guide track means.

Figure 1:
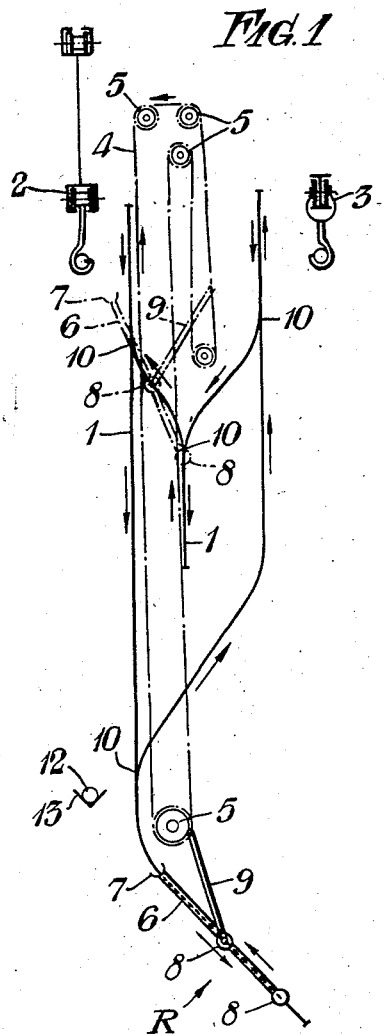
Figure 2:
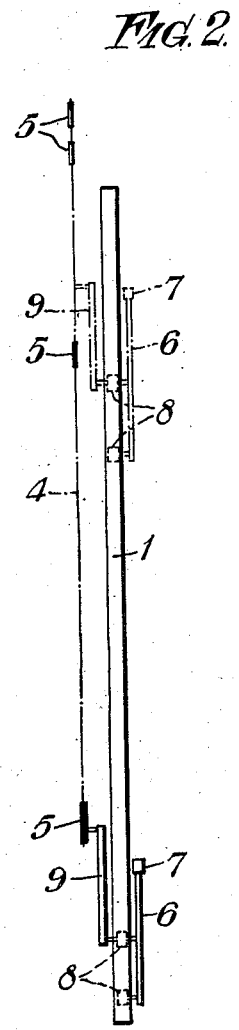
Figure 3:
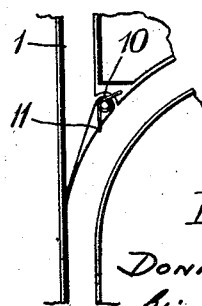
Figure 6:
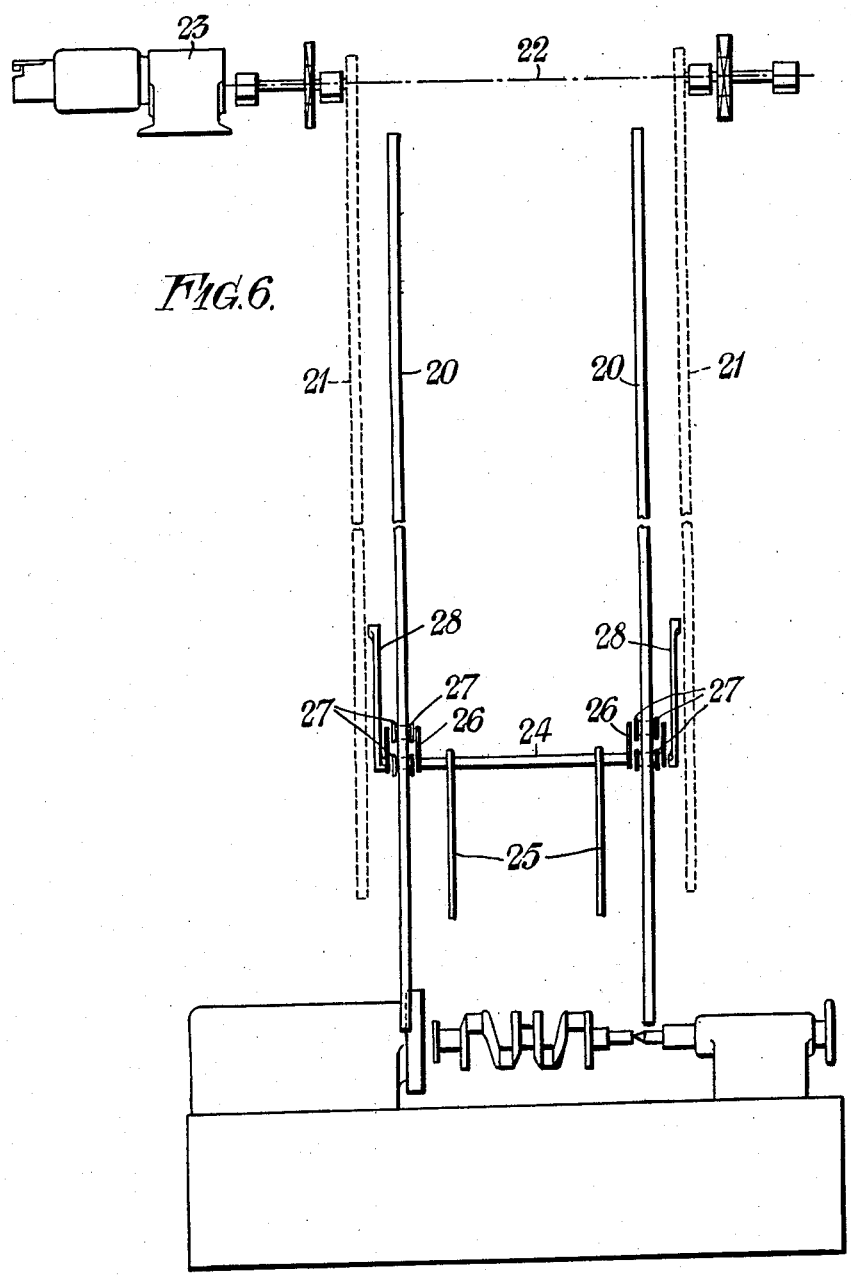

In order that the invention may be clearly understood several embodiments thereof will now be indicated with reference to the accompanying drawings wherein:

Figure 1 shows diagrammatically and in front elevation one form of the device according to the invention as used in conjunction with an overhead light type conveyor having two spaced parallel runs and with an underlying machine tool, Figure 2 is a diagrammatic side elevation of the device according to Figure 1, the conveyor being omitted, Figure 3 is a detail view to an enlarged scale, Figure 4 shows an alternative arrangement of the device as employed with an overhead light conveyor, and Figure 5 shows yet another alternative form as applied to an overhead light conveyor having two superposed parallel runs, Figure 6 is a diagrammatic side elevational view illustrating a constructional form of the device.

Referring now to the drawings, vertical guide tracks 1 are arranged in the manner shown in Figures 1 and 2, the upper ends of the tracks 1 being located between two overhead conveyor chains 2, 3 and the lower end of the tracks being located substantially at ground level. An endless elevator chain 4 carried on sprockets 5 is arranged to lie in a plane substantially parallel to the plane containing the tracks 1 and is capable of being driven intermittently in the direction of the arrows via a caterpillar arrangement from the conveyor which latter may be of the "Duflex" type.

A carrier constituted by an arm 6 having a stirrup 7 at one end is supported on a pair of rollers 8 which are arranged to engage the guide tracks, the arm being located outside the said guides as shown in Figure 2. The roller 8 which is nearer the stirrup 7 is connected by means of a link 9 to the endless chain 4. At each branch point 10 in the tracks as shown there is provided a spring-influenced tongue 11 (see Figure 3), these tongues being arranged to determine the path to be taken by the rollers 8 when the latter are drawn along the guide tracks by means of the link 9 and chain 4.

The machine tool to which, in this example, articles from the conveyor are to be delivered and from which articles are to be returned to the conveyor will be provided with retractable centres indicated diagrammatically at 12 and also with V-shaped supporting blocks 13 which are arranged to retract automatically when an article delivered to the machine tool is picked up by the retractable centres. Suitable mechanical and electric interlocks will be provided.

In use, when the operation of the machine tool has been completed on an article such, for example, as a crank-shaft, the V-blocks 13 approach to the position shown and support the shaft, and the machine centres then recede and in so doing bring the conveyor into operation. This in turn sets the chain 4 in motion in the direction of the arrows, and the carrier is thereby drawn up the tracks 1, the stirrup 7 picking up the shaft whilst the carrier negotiates the first bend in the tracks during its upward journey. Due to the position of the tongue 11, the carrier supporting the crank-shaft is deflected up the right-hand track fork in the direction of the arrow and is elevated up to the top of this track. After reaching the top of the track the carrier is then drawn downwards again in the opposite direction due to the chain arrangement and is carried along the right-hand fork (when considered in the direction of motion of the carrier), as indicated by the arrows. The fork taken by the carrier is of course again determined by suitable positioning of a spring tongue 11. Whilst negotiating the bend at the fork during its downward movement, the carrier delivers the shaft to the conveyor chain 3 and then continues on down towards the bottom of the centre track portion.

When the roller 8 of the carrier which is nearer the stirrup 7 has cleared the tongue at the fork of the centre track portion, the direction of motion of the carrier 6 will again be reversed due to the fact that the link 9 will now be drawn upwards by the extreme right-hand chain run as shown in Figure 1, and the carrier will travel up the left hand fork of the centre track portion, the stirrup 7 on the carrier then picking up a shaft from the conveyor run 2. The carrier will then be raised up above the upper fork in the left-hand portion of the track, as viewed in the drawings, and when the roller 8 which is remote from the stirrup has cleared this fork the carrier will then be moved in a downward direction as indicated by the arrows, the link 9 being now positioned at the top of the left-hand chain run. The carrier will then be conveyed straight down the left-hand track and when negotiating the bend of the bottom will deposit the shaft in the V-blocks 13. After depositing the shaft the carrier is moved into a position of rest as indicated at R at the lower part of Figure 1, the chain 4 being stopped until the operation of the machine tool has been completed.

The cycle of operations as described can be repeated continuously, the whole system being synchronised due to the fact that the overhead conveyor chains, which have a common drive, provide the driving power for the endless chain 4.

The lay-out shown in Figure 4 operates in substantially the same manner as that described in connection with Figures 1 to 3, except that in this case two separate sets of guide tracks 1a, 1b and chains 4a, 4b are employed, a separate carrier 6 being arranged to run in each track. With the arrangement shown in Figure 4 the carrier 6 running in the guides 1a serves to transfer shafts from the conveyor run 2a to a machine tool not shown, and the same carrier also serves to pick up shafts from the machine tool and carry them up to a central position as shown, where they are transferred to the carrier 6 running in the track 1b and thence taken and placed on the conveyor chain 3a. All motions of the device are, of course, synchronised as in the previous example. As in the previous example the carrier is moved into a rest position indicated at R during operation of the machine tool.

In Figure 5 there is shown yet another lay-out in which the device is employed with two superposed conveyor chains 2b and 3b, the machine centres being shown diagrammatically at 12b. With this arrangement the tracks 1c are laid out as shown and the path of the chain 4c is suitably modified to conform with this track lay-out. The carrier 6a in this form is slightly modified in shape the rollers 8 being brought rather closer together and the stirrup 7 being replaced by a hook 7a. The carrier is shown at the bottom of the figure in full lines in the position in which it is loading a shaft onto a machine and in dotted lines in a position in which it is removing a shaft from the machine. After delivery of a shaft to the machine the carrier 6a is caused to travel along the upwardly directed section of the loop 1d in the direction of the arrows and into a rest position indicated at R. Upon completion of the operation of the machine tool the carrier is moved from the rest position down the other leg of the loop 1d until it reaches the withdrawal position as shown whereupon it reverses its motion and travels up the right-hand guide track to the top until the roller 8 nearer the hook has passed the fork 10 at the top of this right-hand track. When it has passed this fork the carrier, by virtue of the tongue 11 (not shown) travels in a downward direction along the right-fork (viewed in the direction of motion), and delivers the shaft to the conveyor chain 3b. After delivery of the shaft to the conveyor chain 3b, the carrier again travels in the upward direction as shown by the arrows until it can withdraw a shaft from the conveyor chain 2b. The carrier then conveys this fresh shaft up to the top of the track system and down again via the left-hand track to deliver it to the machine tool.

It will be appreciated that in order to provide adequate or stable suspension for articles such as crankshafts it will be necessary for any of the various mechanisms described above to be duplicated i. e. it will be necessary to dispose two similar sets of mechanism in side by side relationship at convenient distances apart, the arrangement being such that a carrier associated with the elevator chain of one set will be paired with a carrier associated with the elevator chain of the second set, said carriers being adapted to move around their respective circuits at the same speed and being so spaced apart relatively to each other in the same horizontal plane that they will engage the article to be carried at points conveniently spaced to provide a stable suspension for such article. Obviously the two elevator chains will require to be driven at the same speed and this may readily be done by driving them from a common drive shaft which may in turn be driven by an electric motor or from any other suitable source such for example, as the overhead chain conveyors. Furthermore, instead of mounting the carriers of the two sets of mechanism separately said carriers may be arranged in pairs on shafts or rods, each shaft or rod which has two carriers associated therewith being arranged to extend between the two sets of tracks and the necessary rollers which are adapted to engage the latter (i. e. the rollers 8) being associated with arms which are fixedly mounted at opposite ends of said shaft or rod in such a manner as to engage and run on the respective tracks. With such an arrangement the shaft or rod supporting the carriers may readily be coupled to the two elevator chains by means of links (such as the links 9), so that the requisite motion will be imparted to said shaft or rod and hence to the carrier.

One arrangement such as is indicated above is illustrated in Figure 6 wherein 20 denotes two similar tracks which are arranged in spaced parallel relationship and may correspond to the tracks 1, 1a, 1b or 1c disclosed in Figures 1–5. Disposed adjacent each track 20 is an elevator chain 21 said chains being driven from a common drive shaft 22 to which latter a drive is imparted from a motor 23. Located between the tracks 20 is a shaft or rod 24 on which two carriers 25 are mounted such carriers corresponding in this instance to the hooks indicated in Figure 5. Fixedly mounted at each end of the shaft or rod 24 is an arm 26 having rollers 27 associated therewith, which correspond to the rollers 8 (Figure 5), being adapted to engage the tracks 20. The requisite motion is imparted from the elevator chains 21 to the shaft or rod 24 and hence to the carriers 25 by means of links such as are indicated at 28.

It will also be readily appreciated that several carriers or pairs of carriers may be used on each mechanism or pair of mechanisms, the actual number employed depending, of course, upon the height of the overhead conveyors which height would determine the length of the elevator chain or chains involved.

The tracks with which the rollers associated with the carriers are adapted to co-operate may be of open section i. e. may comprise two parallel rail members disposed in spaced parallel relationship and if desired each rail member may be channelled to provide lateral guides for plain rollers or in the case where flanged rollers are employed as indicated in Figure 6 plain or flat rail members may be utilised.

I claim:

1. A loading and unloading device comprising two identical fixed guide tracks which are disposed in spaced parallel relationship, each of said guide tracks including "up" and "down" sections extending substantially vertically between two points at different levels, said "up" and "down" sections being interconnected to form a closed circuit and having inclined portions adjacent said two points, a bar extending horizontally between said two guide tracks, two spaced apart rollers mounted on each end of said bar and in rolling contact with the adjacent one of said guide tracks at spaced apart locations along the latter so that said rollers control the rocking of said bar as they travel along the closed circuit formed by the related guide track, endless drive chain means substantially following the closed circuits formed by said guide tracks, link means connecting said bar to said drive chain means so that the latter effects movement of said bar along said "up" and "down" sections, and article carrier elements extending radially from said bar to rock with the latter when said rollers ride on said inclined portions of the tracks and thereby to be projected into article receiving and article delivering positions at said two points at spaced levels.

2. A loading and unloading device comprising two identical fixed guide tracks disposed in spaced apart vertical planes, each of said guide tracks including "up" and "down" sections spaced apart in the related one of said planes for substantial parts of their lengths and interconnected to terminate in identical paths at their opposite ends and define a closed circuit, said "up" and "down" sections extending between two points at different levels and further having inclined portions adjacent said two points, a bar extending horizontally between said two guide tracks, two spaced apart rollers mounted on each end of said bar and in rolling contact with the adjacent one of said guide tracks at spaced apart locations along the latter so that said rollers constrain the bar to move along said closed circuit and control the rocking of said bar during such movement, endless drive chain means substantially following the closed circuits defined by said guide tracks, link means connecting said bar to said drive chain means so that during operation of the latter said bar travels along said closed circuits, and article carrier elements extending radially from said bar to travel and rock with the latter so that, when said rollers ride on said inclined portions of the tracks, said article carrier elements are projected into article receiving and delivering positions at said two points at different levels.

3. A loading and unloading device comprising two identical fixed guide tracks disposed in spaced apart vertical planes, each of said guide tracks including "up" and "down" sections extending between an article supplying location and an article delivering and pick-up location at different levels, said "up" and "down" sections being spaced apart in the related one of said planes for substantial parts of their lengths and coming together to follow identical paths adjacent said locations at different levels and to define a closed circuit, a bar extending horizontally between said two guide tracks, two spaced apart rollers mounted on each end of said bar and in rolling contact with the adjacent one of said guide tracks at spaced apart locations along the latter so that said rollers constrain the bar to move along said closed circuit and control the rocking of said bar during such movement, endless drive chain means substantially following the closed circuits defined by said guide tracks, link means connecting said bar to said drive chain means so that during operation of the latter said bar travels along said closed circuits, article carrier elements extending radially from said bar to travel and rock with the latter, said "up" section of each guide track having an inclined portion before coming together with said "down" section to follow identical paths adjacent said article supplying location so that said carrier elements are there rocked to article receiving position, and said identical paths of said "down" and "up" sections adjacent said article delivering and pick-up location being inclined so that said carrier elements are there rocked to article delivering and pick-up position for delivering a carried article at the adjacent location during travel of said bar downwardly along the inclined identical paths and for picking-up the previously delivered article during movement of said bar upwardly along the inclined identical paths.

4. A loading and unloading device according to claim 3; further comprising means on said guide tracks at the points where said "up" and "down" sections come together and operative to direct said rollers to follow a predetermined course around said closed circuits.

5. A loading and unloading device according to claim 3; further comprising spring urged switching tongues on said guide tracks at the points where said "up" and "down" sections come together and operative to guide said rollers for movement in a single direction around said closed circuits.

References Cited in the file of this patent

UNITED STATES PATENTS

| Number | Name | Date |
|---|---|---|
| 798,450 | Roberts | Aug. 29, 1905 |
| 1,951,400 | Dvorak | Mar. 20, 1934 |